(12) United States Patent
Chakkirala et al.

(10) Patent No.: US 10,374,514 B2
(45) Date of Patent: Aug. 6, 2019

(54) BOOST CONVERTERS HAVING SELF-ADAPTIVE MAXIMUM DUTY-CYCLE-LIMIT CONTROL

(71) Applicant: QUALCOMM Incorporated, San Diego, CA (US)

(72) Inventors: Subbarao Surendra Chakkirala, San Jose, CA (US); Jiwei Chen, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 701 days.

(21) Appl. No.: 14/534,034

(22) Filed: Nov. 5, 2014

(65) Prior Publication Data

US 2016/0126839 A1 May 5, 2016

(51) Int. Cl.
*H02M 3/158* (2006.01)
*H02M 3/156* (2006.01)
*H02M 1/00* (2006.01)

(52) U.S. Cl.
CPC ........... *H02M 3/158* (2013.01); *H02M 3/156* (2013.01); *H02M 2001/0012* (2013.01); *H02M 2001/0022* (2013.01)

(58) Field of Classification Search
CPC ......... H02M 2001/0003; H02M 3/156; H02M 3/157; H02M 2001/0012; H02M 2001/0022; H02M 2001/0025; H02M 2001/0029; H02M 2001/0032; H02M 3/158

See application file for complete search history.

(56) References Cited

U.S. PATENT DOCUMENTS

| | | | |
|---|---|---|---|
| 7,109,695 B2 | 9/2006 | King et al. | |
| 7,906,949 B1 | 3/2011 | Sutardja et al. | |
| 8,194,417 B2 | 6/2012 | Chang | |
| 8,232,787 B2 | 7/2012 | De Cremoux | |
| 8,564,259 B2 * | 10/2013 | Chen | H02M 3/1582 323/259 |
| 8,716,999 B2 | 5/2014 | Williams | |
| 9,084,303 B2 * | 7/2015 | Wee | H02M 3/33523 |

(Continued)

FOREIGN PATENT DOCUMENTS

| | | |
|---|---|---|
| CN | 101459382 A | 6/2009 |
| CN | 101714819 A | 5/2010 |

(Continued)

OTHER PUBLICATIONS

International Search Report and Written Opinion—PCT/US2015/053706—ISA/EPO—Feb. 10, 2016.

*Primary Examiner* — Yusef A Ahmed
*Assistant Examiner* — Shahzeb K Ahmad
(74) *Attorney, Agent, or Firm* — Haynes and Boone, LLP

(57) ABSTRACT

In one embodiment, a control circuit adjusts a duty cycle of a boost converter and comprises a duty cycle limiter generator configured to receive an input voltage provided to the boost converter and to generate a control signal to be provided to the boost converter for adjusting the duty cycle of the boost converter to control the output voltage of the booster converter in response to the input voltage. In one embodiment, the maximum duty cycle limit generator further generates the maximum duty cycle signal in response to an output voltage of the boost converter.

20 Claims, 10 Drawing Sheets

(56) References Cited

U.S. PATENT DOCUMENTS

| | | | |
|---|---|---|---|
| 2009/0153123 A1* | 6/2009 | Kraft | H02M 1/32 323/285 |
| 2010/0079123 A1 | 4/2010 | Miyamae | |
| 2011/0140684 A1 | 6/2011 | Chen | |
| 2013/0049723 A1* | 2/2013 | Latham, II | H02M 3/157 323/282 |

FOREIGN PATENT DOCUMENTS

| | | |
|---|---|---|
| CN | 102598866 A | 7/2012 |
| EP | 1503489 A2 | 2/2005 |

* cited by examiner

BOOST CONVERTERS HAVING SELF-ADAPTIVE MAXIMUM DUTY-CYCLE-LIMIT CONTROL

BACKGROUND

The disclosure relates to boost converters, and in particular, to boost converters having self-adaptive maximum duty-cycle-limit control.

Unless otherwise indicated herein, the approaches described in this section are not admitted to be prior art by inclusion in this section.

Boost converters generate an output voltage Vout that is higher than an input voltage Vin by switching the boost converter at a fixed duty cycle. Achieving acceptable regulation by the boost converter can be difficult when the boost converter drives higher output loads at lower input voltages. This problem often occurs when the gain of the boost converter is high and has a large variation. For example, the input voltage Vin may vary from 2.5 Volts to 4.7 Volts, while the output voltage Vout is at 10 Volts (producing a gain of 2.12 to 4.0 by the boost converter).

Achieving acceptable reliability and acceptable spike levels can be difficult when the input voltage Vin is very close to the target output voltage Vout. In this instance, the duty cycle should be lower. Because the duty cycle is fixed, the possible maximum output voltage defined by the maximum duty cycle can be much higher than the target output voltage of the boost converter.

SUMMARY

The present disclosure describes boost converters having self-adaptive maximum duty-cycle-limit control.

In one embodiment, a control circuit adjusts a duty cycle of a boost converter. The control circuit comprises a duty cycle limiter generator configured to receive an input voltage provided to the boost converter and to generate a control signal to be provided to the boost converter for adjusting the duty cycle of the boost converter to control the output voltage of the booster converter in response to the input voltage.

In one embodiment, the duty cycle limiter generator comprises an analog-to-digital converter to generate a digitized signal in response to an input voltage of the boost converter; and a duty cycle limit generator to generate a maximum duty cycle signal to limit the duty cycle of the boost converter in response to the digitized signal generated by the analog-to-digital converter.

In one embodiment, the maximum duty cycle limit generator comprises a current starved buffer to provide a current in response to a switching signal provided to control the boost converter; a capacitor coupled between the output of the current starved buffer and ground; a reference voltage selection circuit to generate a reference voltage in response to the digitized signal; and a comparator to generate a maximum duty cycle signal in response to a voltage across the capacitor and the reference voltage.

In one embodiment, the maximum duty cycle limit generator further generates the maximum duty cycle signal in response to an output voltage of the boost converter.

In one embodiment, the maximum duty cycle limit generator comprises: a voltage-to-current converter to generate a current in response to the input voltage and an output voltage of the boost converter; an analog timer to time the current; and a duty cycle limit generator to generate a maximum duty cycle signal in response to the timed current.

In one embodiment, the analog timer is a capacitor coupled to an output of the voltage-to-current generator to store the current.

In one embodiment, the maximum duty cycle limit generator comprises a variable current source to generate a bias current in response to the current from the voltage-to-current converter; a buffer to provide a buffer current in response to the bias current and a switching signal provided to control the boost converter; a capacitor coupled between the output of the current starved buffer and ground; and a comparator to generate a maximum duty cycle signal in response to a voltage across the capacitor and a reference voltage.

In one embodiment, a method is for adjusting a duty cycle of a boost converter. The method comprises receiving an input voltage provided to the boost converter; and generating a control signal to provide to the boost converter for adjusting the duty cycle of the boost converter to control the output voltage of the booster converter in response to the input voltage.

In one embodiment, generating a control signal comprises generating a digitized signal in response to the input voltage of the boost converter; and generating a maximum duty cycle signal to limit the duty cycle of the boost converter in response to the digitized signal.

In one embodiment, generating the maximum duty cycle signal comprises generating a current in response to a switching signal provided to control the boost converter; storing the current; generating a reference voltage in response to the digitized signal, and comparing the stored buffer current and the reference voltage to generate a maximum duty cycle signal.

In one embodiment, generating the control signal further comprises generating the control signal in response to the input voltage and an output voltage of the boost converter.

In one embodiment, generating the control signal comprises generating a current in response to the input voltage and an output voltage of the boost converter; timing the generated current; and generating a maximum duty cycle signal in response to the timed current.

In one embodiment, timing the generated current comprising storing charge of the generated current.

In one embodiment, generating a maximum duty cycle signal comprises generating a bias current in response to the generated current; generating a buffer current in response to the bias current and a switching signal provided to control the boost converter; storing the buffer current; and comparing the stored buffer current and a reference voltage to generate a maximum duty cycle signal in response to a voltage indicative of the stored buffer current and a reference voltage.

In one embodiment, a control circuit is for adjusting a duty cycle of a boost converter. The control circuit comprises means for receiving an input voltage provided to the boost converter; and means for generating a control signal to provide to the boost converter for adjusting the duty cycle of the boost converter to control the output voltage of the booster converter in response to the input voltage.

In one embodiment, the means for generating a control signal comprises means for generating a digitized signal in response to the input voltage of the boost converter; and means for generating a maximum duty cycle signal to limit the duty cycle of the boost converter in response to the digitized signal.

In one embodiment, the means for generating the maximum duty cycle signal comprises means for generating a current in response to a switching signal provided to control the boost converter; means for storing the current; means for generating a reference voltage in response to the digitized signal, and means for comparing the stored buffer current and the reference voltage to generate a maximum duty cycle signal.

In one embodiment, the means for generating the control signal further comprises means for generating the control signal in response to the input voltage and an output voltage of the boost converter.

In one embodiment, the means for generating the control signal comprises means for generating a current in response to the input voltage and an output voltage of the boost converter; means for timing the generated current; and means for generating a maximum duty cycle signal in response to the timed current.

In one embodiment, the means for timing the generated current comprising means for storing charge of the generated current.

In one embodiment, the means for generating a maximum duty cycle signal comprises means for generating a bias current in response to the generated current; means for generating a buffer current in response to the bias current and a switching signal provided to control the boost converter; means for storing the buffer current; and means for comparing the stored buffer current and a reference voltage to generate a maximum duty cycle signal in response to a voltage indicative of the stored buffer current and a reference voltage.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
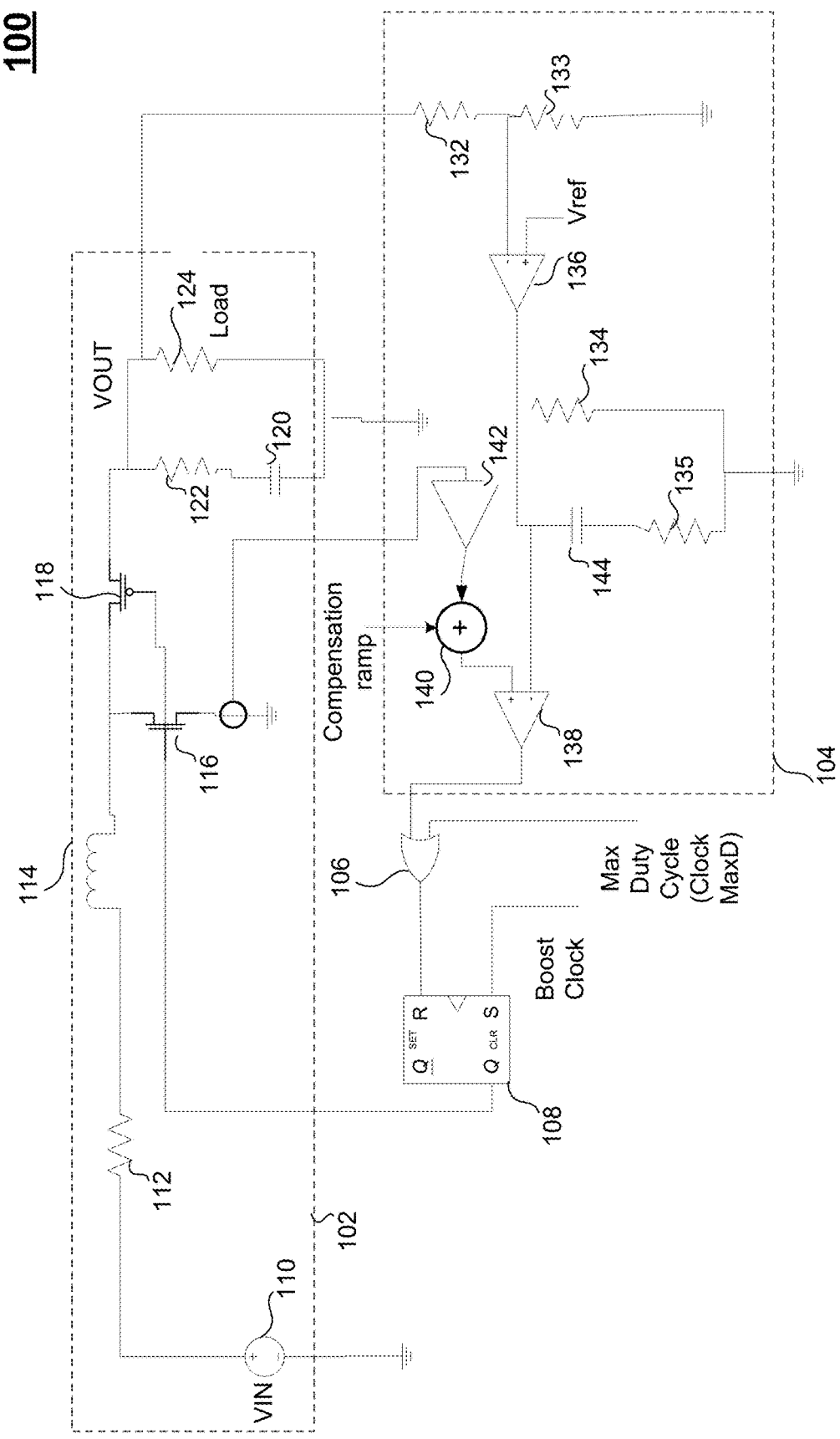
FIG. 1 illustrates a block diagram of a conventional boost converter.

FIG. 1 illustrates a block diagram of a conventional boost converter 100. Boost converter 100 comprises a boost converter 102, a feedback circuit 104, an OR gate 106, and a RS flip-flop 108. Boost converter 102 is a power converter with an output DC voltage that is greater than an input DC voltage. Feedback circuit 104 detects the output voltage Vout and an inductor current and generates a trigger signal in response to a voltage indicative of the inductor current exceeding a threshold set by the output voltage. Feedback circuit 104 provides the trigger signal to a first input of OR gate 106. A second input of OR gate 106 receives a maximum duty cycle (ClockMaxD) signal that is fixed (in this example, fixed at 50% duty). OR gate 106 provides a reset signal to RS flip-flop 108 in response to either the trigger signal or the maximum duty cycle (ClockMaxD) signal being high. RS flip-flop 108 provides a control signal to switch boost converter 102 in response to a boost clock input from an external controller (not shown) or the reset signal from OR gate 106.

Boost converter 102 comprises an input voltage (VIN) source 110, a series resistor 112, an inductor 114, an NMOS transistor 116, a PMOS transistor 118, a capacitor 120, an effective series resistor 122, and a load resistor 124. In response to the control signal from RS flip-flop 108, NMOS transistor 116 couples inductor 114 to ground during an on phase of the boost converter 102 for storing energy in inductor 114. During the on phase, RS flip-flop 108 turns off PMOS transistor 118. During an off phase of the boost converter 102, the control signal from RS flip-flop 108 turns off NMOS transistor 116 and turns on PMOS transistor 118 to provide the current stored in inductor 114 to load resistor 124. Capacitor 120 is shown as an ideal capacitor in series with effective series resistor 122. Capacitor 120 stores the inductor current during the off phase.

Feedback circuit 104 comprises a plurality of resistors 132 and 134, a plurality of comparators 136 and 138, a summing circuit 140 and a current to voltage converter 142. Resistors 132 and 134 are coupled in series between the output voltage VOUT and ground and arranged as a voltage divider to provide a feedback voltage indicative of the output voltage VOUT to an inverting input of comparator 136. A reference voltage Vref is provided to a non-inverting input of comparator 136. Comparator 136 provides an output voltage threshold signal to the inverting input of comparator 138 responsive to the output voltage VOUT exceeding a threshold, which is represented by the divided output voltage of resistors 132 and 134 exceeding the reference voltage Vref. Resistors 134 and 135 and capacitor 144 provide filtering for loop stability on the output of comparator 138. The current on the source of NMOS transistor 116 is sensed and provided to current to voltage converter 142, which provides a voltage indicative of the current through NMOS transistor 116 to summing circuit 140. A compensation ramp signal is provided, for loop stability, to summing circuit 140, which provides a ramp voltage signal to the non-inverting input of comparator 138, which provides the trigger signal to the first input of OR gate 106. The operation of OR gate 106 is described above.

Figure 2:
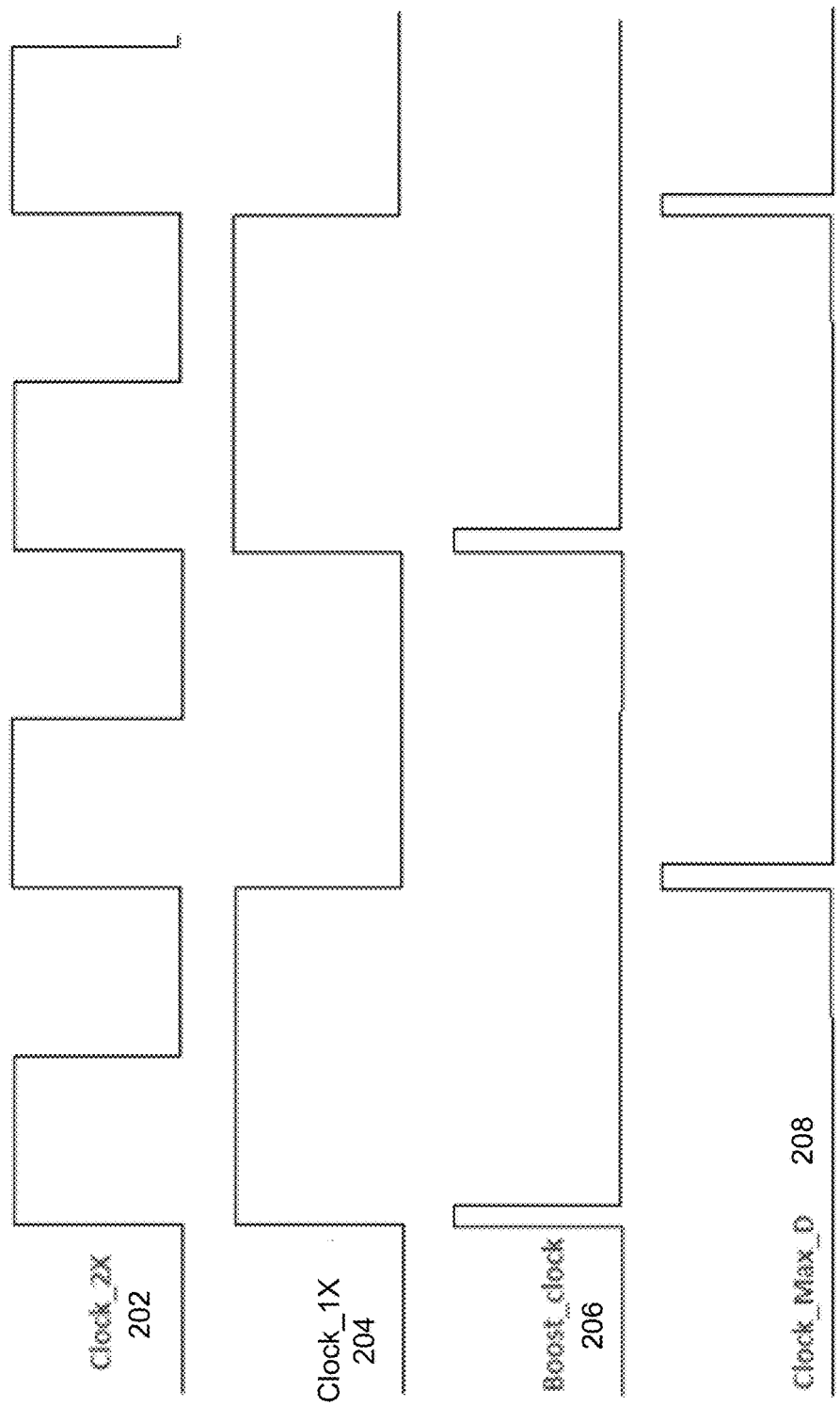
FIG. 2 illustrates a timing diagram of the conventional boost converter of FIG. 1.

FIG. 2 illustrates a timing diagram of boost converter 100. A line 202 illustrates the timing of a clock signal of an external controller of boost converter 100. A line 204 illustrates the timing of a 50% clock signal derived from the clock signal shown in line 202. A line 206 illustrates the timing of the boost clock signal provided to flip-flop 108 by OR gate 106 to set flip-flop 108 to start the on-stage of the boost by boost converter 102.

A line 208 illustrates the timing of the maximum duty cycle clock signal provided to OR gate 106 to reset flip-flop 108 to end the on-stage of the boost by boost converter 102. The pulse of the maximum duty cycle clock signal is fixed.

Figure 3:
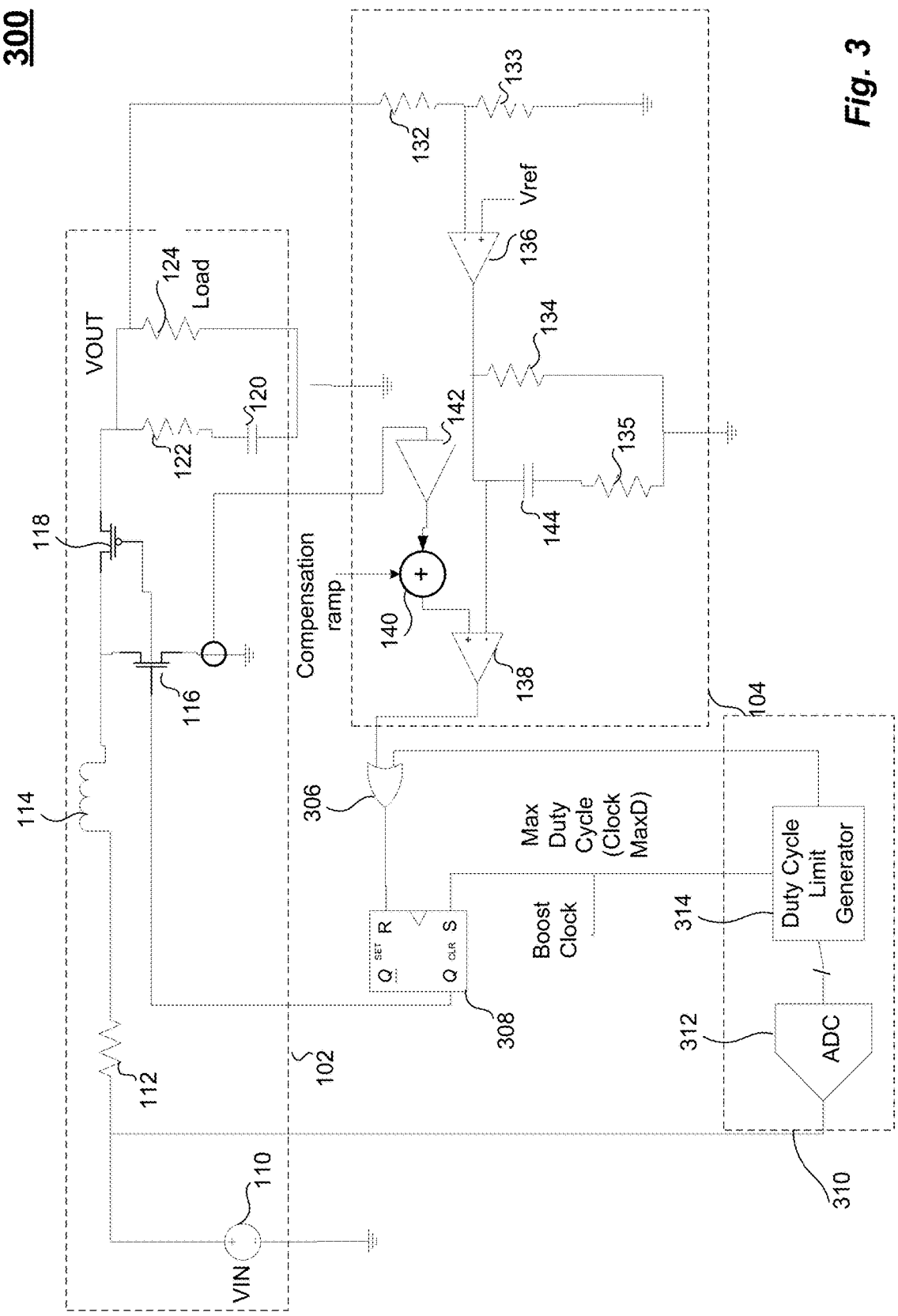
FIG. 3 illustrates a block diagram of a boost converter according to some embodiments.

FIG. 3 illustrates a block diagram of a boost converter 300 according to some embodiments. Boost converter 300 comprises a boost converter 102, a feedback circuit 104, an OR gate 306, a RS flip-flop 308, and a maximum duty cycle limit generator 310. Boost converter 300 may include boost converters other than boost converter 102 or include a feedback circuit other than feedback circuit 104. Feedback circuit 104 provides the trigger signal to a first input of OR gate 306. A second input of OR gate 306 receives a maximum duty cycle (ClockMaxD) signal that is variable from maximum duty cycle limit generator 310. OR gate 306 provides a reset signal to RS flip-flop 308 in response to either a trigger signal from feedback circuit 104 or the maximum duty cycle (ClockMaxD) signal being high. RS flip-flop 308 provides a control signal to switch boost converter 102 in response to a boost clock input from an external controller (not shown) or the reset signal from OR gate 306.

Maximum duty cycle limit generator 310 is adaptive to the input voltage Vin. Maximum duty cycle limit generator 310 adjusts the maximum allowed duty cycle of the control signal from RS flip-flop 308 to boost converter 102 for controlling the output voltage Vout in response to the input voltage Vin. Maximum duty cycle limit generator 310 increases the maximum duty cycle thereby increasing the allowed gain of boost converter 102 in response to a decrease of the input voltage Vin. Conversely, maximum duty cycle limit generator 310 decreases the maximum duty cycle thereby reducing the allowed gain of boost converter 102 in response to an increase of the input voltage Vin.

Figure 7:
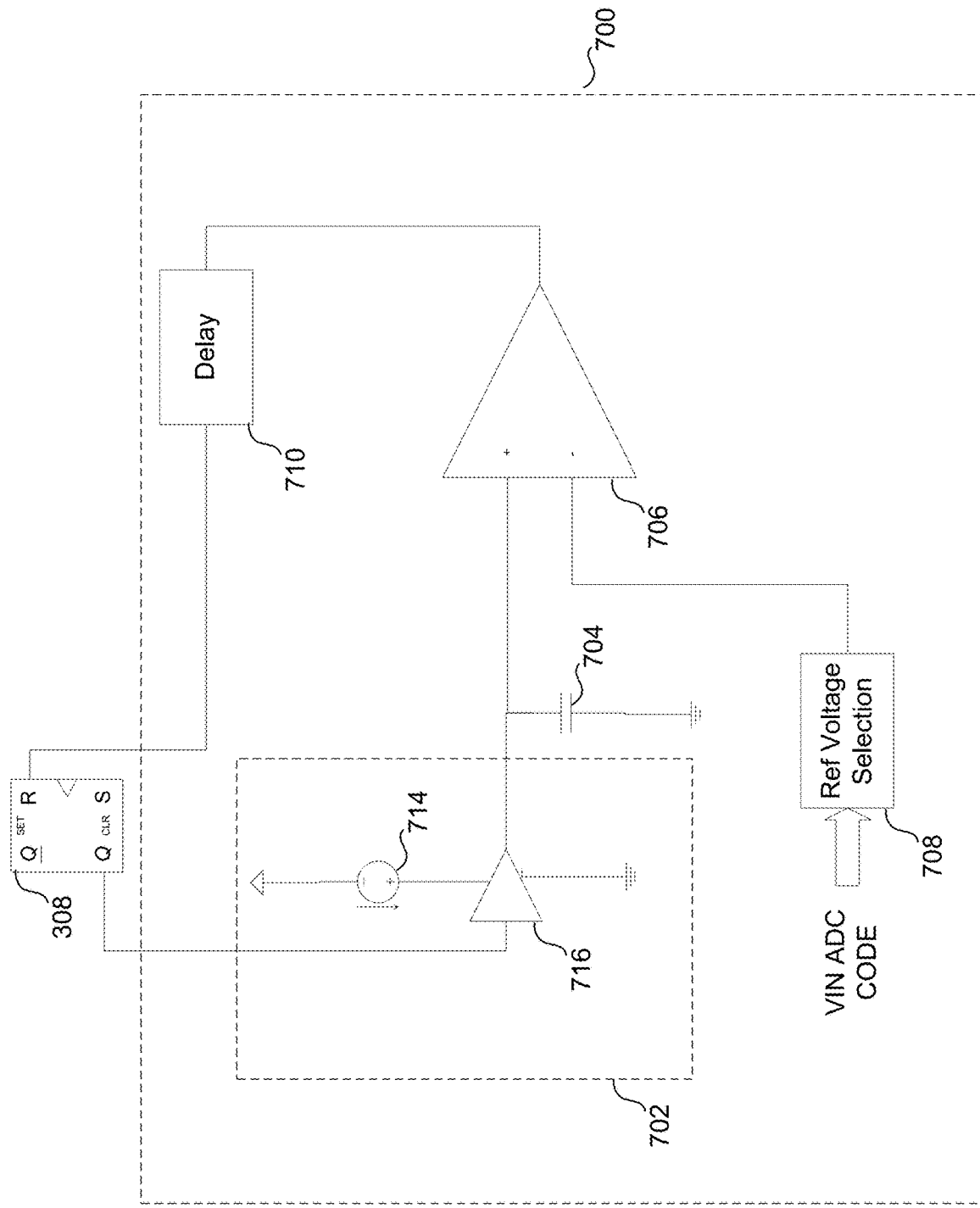
FIG. 7 illustrates a block diagram of a duty cycle limiter according to some embodiments.

Maximum duty cycle limit generator 310 comprises an analog-to-digital converter 312 and a duty cycle limit generator 314. Analog-to-digital converter 312 digitizes the input voltage Vin and provides the digitized signal to duty cycle limit generator 314. Duty cycle limit generator 314 provides the maximum duty cycle (ClockMaxD) signal to OR gate 306 to thereby reset RS flip-flop 308. As described below, FIG. 7 shows an embodiment of duty cycle limit generator 314.

In some embodiments, maximum duty cycle limit generator 310 generates a maximum duty cycle Dmax based on the relationship:

$$D_{max} = 1 - 1/2 \left( \frac{1}{G} - \frac{R_p - R_n}{R_{eq}} \right)$$

where G is the voltage gain (Vout/Vin), Rn is the impedance of NMOS transistor 116, Rp is the impedance of PMOS transistor 118 and Req is the equivalent load resistance (Vout/Iout).

In some embodiments, the equivalent load resistance is much greater than the difference between the impedances of PMOS transistor 118 and NMOS transistor 116:

$(R_{eq} \gg (R_p - R_n),$

In this instance, the maximum duty cycle Dmax becomes:

$$D_{max} = 1 - \frac{1}{2G}$$

The maximum duty cycle limit generators described below may also generate the maximum duty cycle Dmax based on these relationships.

Figure 4:
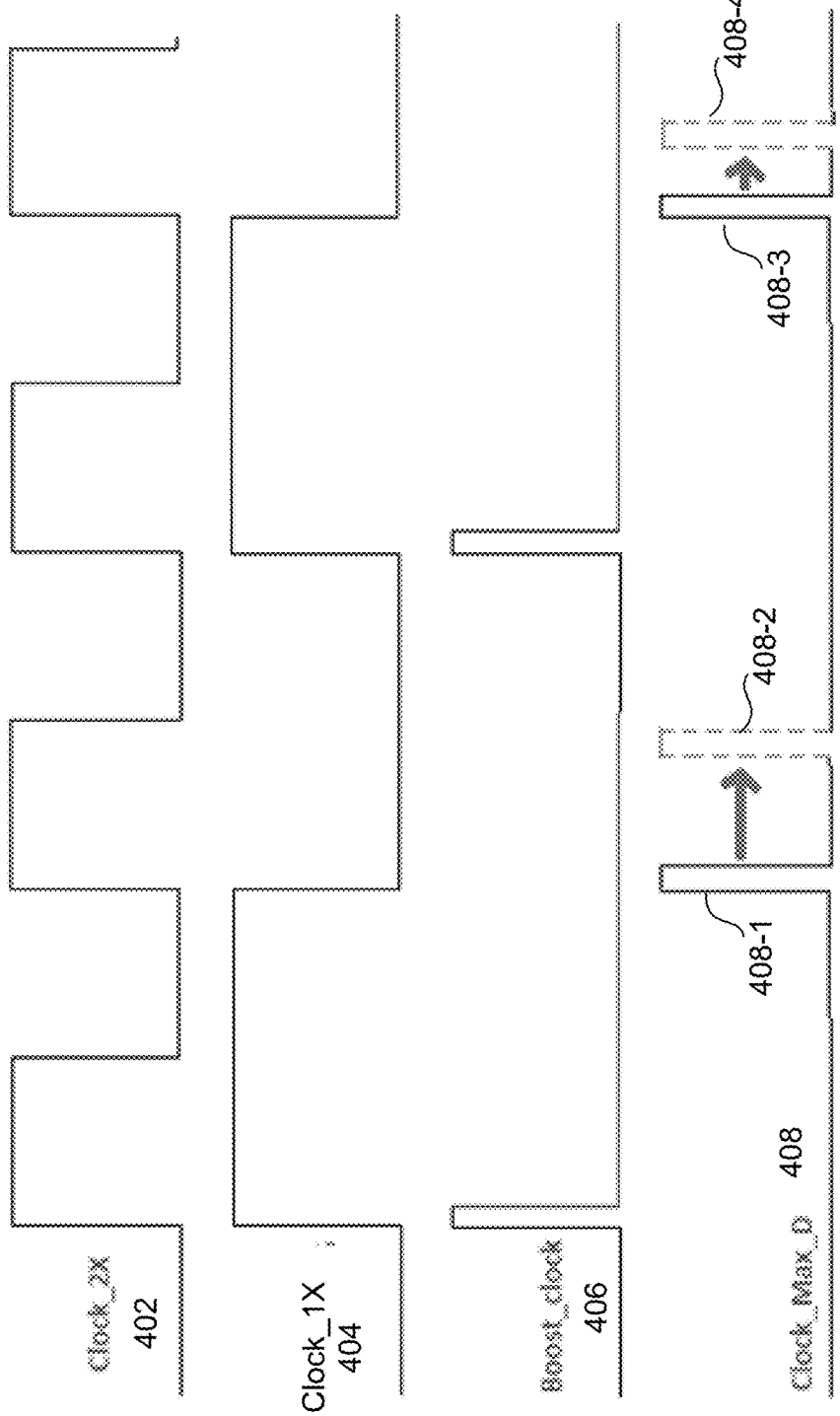
FIG. 4 illustrates a timing diagram of the boost converter of FIG. 3 according to some embodiments.

FIG. 4 illustrates a timing diagram of the boost converter 300. A line 402 illustrates the timing of a clock signal of an external controller of boost converter 300. A line 404 illustrates the timing of a 50% clock signal derived from the clock signal shown in line 402. A line 406 illustrates the timing of the boost clock signal provided to flip-flop 108 by OR gate 306 to set flip-flop 108 to start the on-stage of the boost by boost converter 102.

A line 408 illustrates the timing of the maximum duty cycle clock signal provided to OR gate 306 to reset flip-flop 308 to end the on-stage of the boost by boost converter 102. Maximum duty cycle limit generator 310 adjusts the timing of the maximum clock duty signal, as shown by the arrow in FIG. 4, to change the duty cycle. The pulse of the maximum duty cycle clock signal is variable. Pulses 408-1 and 408-3 represents pulses corresponding to a 50% duty cycle. Boost converter 300 can change the maximum duty cycle of boost regulator 302 by generating maximum duty cycle (ClockMaxD) signals that occurs at a different time than pulse 408-1 and pulse 408-3. In this example, maximum duty cycle (ClockMaxD) signal occurs as pulse 408-2, which is later than pulse 408-1, and a pulse 408-4, which is later than pulse 408-3. Pulse 408-4 occurs at a time after pulse 408-3 that is shorter than the time pulse 408-2 is after pulse 408-1. Although not shown in FIG. 4, the pulses 408-2 and 408-4 may occur before pulse 408-1 and 408-3, respectively.

Figure 5:
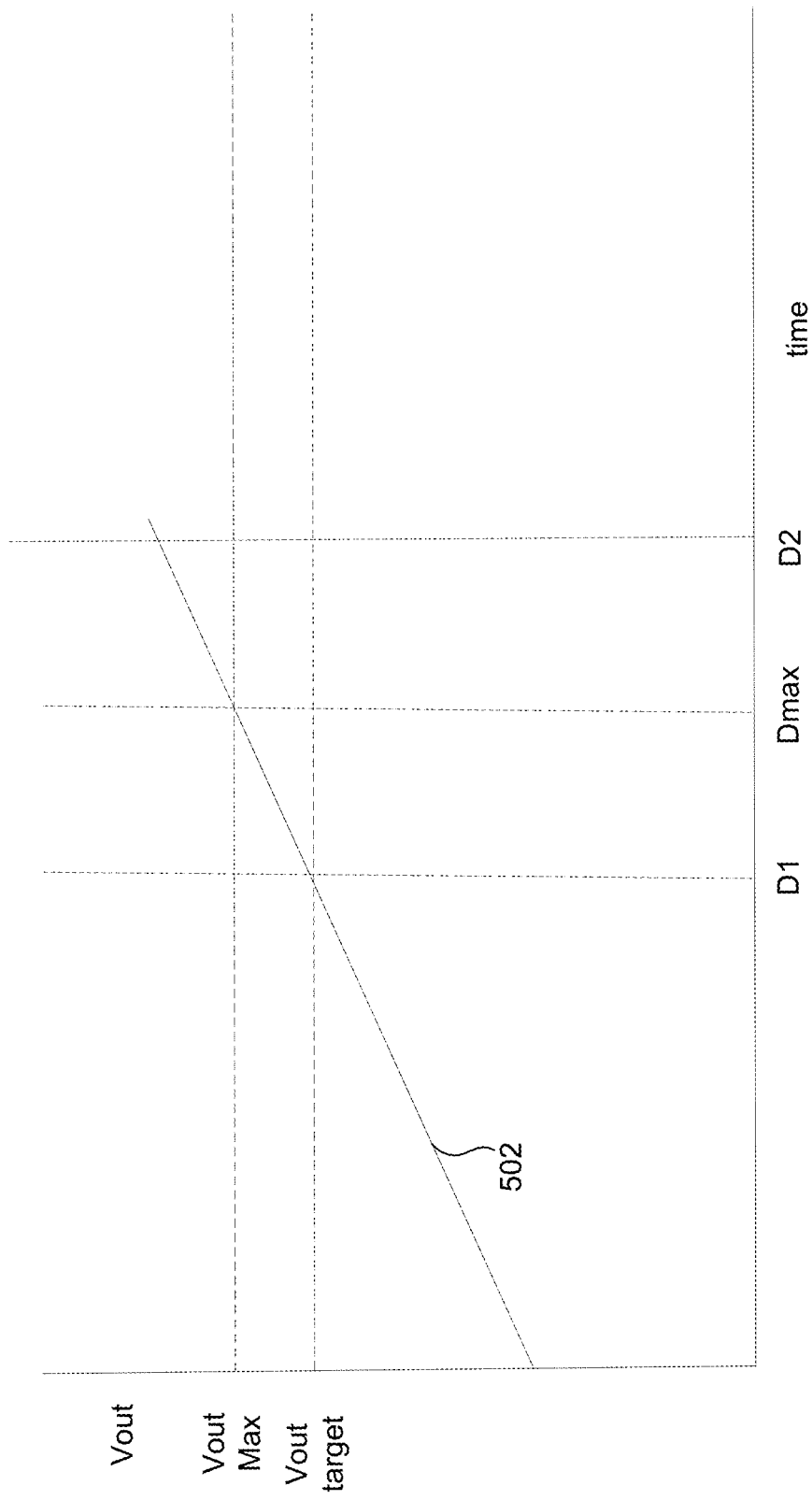
FIG. 5 illustrates a timing diagram of adaptive duty cycle of the boost converter of FIG. 3 according to some embodiments.

FIG. 5 illustrates a timing diagram of adaptive duty cycle of boost converter 300 according to some embodiments. Line 502 represents the output voltage Vout of boost converter 300 over time. In this example, line 502 is at the target Vout for a duty cycle D1. If the duty cycle increases to duty cycle D2, the output voltage Vout exceeds the maximum output voltage Vout. Boost converter 300 sets the maximum duty cycle Dmax to limit the output voltage of boost converter 300 to the maximum output voltage Vout.

Figure 6:
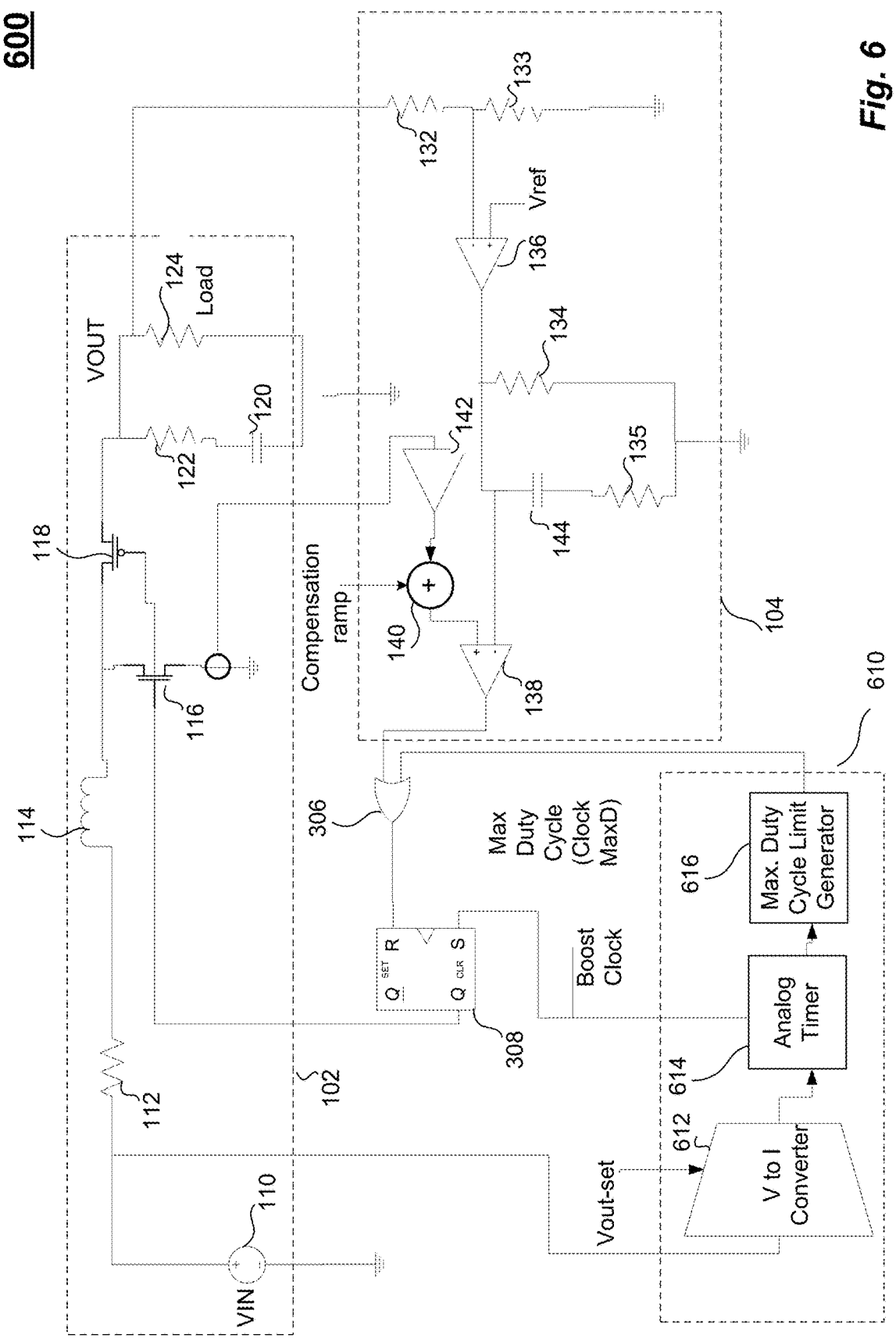
FIG. 6 illustrates a block diagram of a boost converter according to some embodiments.

FIG. 6 illustrates a block diagram of a boost converter 600 according to some embodiments. Boost converter 600 comprises a boost converter 102, a feedback circuit 104, an OR gate 306, a RS flip-flop 308, and a maximum duty cycle limit generator 610. Boost converter 600 may include boost converters other than boost converter 102 or include a feedback circuit other than feedback circuit 104. Feedback circuit 104 provides the trigger signal to a first input of OR gate 306. A second input of OR gate 306 receives a maximum duty cycle (ClockMaxD) signal that is variable from maximum duty cycle limit generator 610. OR gate 306 provides a reset signal to RS flip-flop 308 in response to either a trigger signal from feedback circuit 104 or the maximum duty cycle (ClockMaxD) signal being high. RS flip-flop 308 provides a control signal to switch boost converter 102 in response to a boost clock input from an external controller (not shown) or the reset signal from OR gate 306.

Maximum duty cycle limit generator 610 is adaptive to the input voltage Vin and the output voltage Vout. Maximum duty cycle limit generator 610 adjusts the maximum duty cycle of the control signal from RS flip-flop 308 to boost converter 102 for controlling the output voltage Vout in response to the input voltage Vin and the output voltage Vout. Maximum duty cycle limit generator 610 increases the maximum duty cycle thereby increasing the allowed gain of boost converter 102 in response to a decrease of the input voltage Vin or a decrease in the output voltage Vout. Conversely, maximum duty cycle limit generator 610 decreases the maximum duty cycle thereby reducing the allowed gain of boost converter 102 in response to an increase of the input voltage Vin or an increase in the output voltage Vout.

Maximum duty cycle limit generator 610 comprises a voltage-to-current converter 612, an analog timer 614, and a duty cycle limit generator 616. Voltage-to-current converter 612 converts the input voltage Vin to a current that is provided to analog timer 614. The conversion of voltage to current is based on or is a function of an output voltage setting Vout-set, which is the programmed value of the output voltage. Analog timer 614 determines a time in relation to the boost clock for the duration from a start of the duty cycle, and provides the time to duty cycle limit generator 314. Duty cycle limit generator 616 provides the maximum duty cycle (ClockMaxD) signal to OR gate 306 in response to the time equaling or exceeding a threshold time to thereby reset RS flip-flop 308. As described below, FIG. 8 shows an embodiment of duty cycle limit generator 614.

FIG. 7 illustrates a block diagram of a duty cycle limiter 700 according to some embodiments. Duty cycle limiter 700 may be used for duty cycle limit generator 314. Duty cycle limiter 700 comprises a buffer 702, a capacitor 704, a comparator 706, a reference voltage selection circuit 708, and a delay circuit 710. Buffer 702 comprises a current source 714 and a current starved buffer 716 coupled in series between a supply voltage and ground. Current starved buffer 716 provides a voltage signal to capacitor 704 to charge capacitor 704 and to the non-inverting input of comparator 706 to trigger the comparator 706 in response to the control signal from RS flip-flop 308 that switches boost converter 102. The charging of capacitor 704 functions as a timer. Capacitor 704 can be discharged for the next duty cycle by a discharge circuit (not shown).

Reference voltage selection circuit 708 provides a reference voltage to the inverting input of comparator 706 in response to the input voltage code (VIN ADC CODE) from ADC 312. The reference voltage is inversely proportional to the input voltage VIN as indicated by the input voltage code. In other words, higher input voltages generate lower reference voltages, and, conversely, lower input voltages generate higher reference voltages. Comparator 706 provides a signal to delay circuit 710 to reset RS flip-flop 308 in response to the voltage across capacitor 704 exceeding the reference voltage set by reference voltage selection circuit 708. The amount of current from current source 714 and a default reference voltage output may be calibrated during power-on to set them to work for any input clock frequency.

Figure 8:
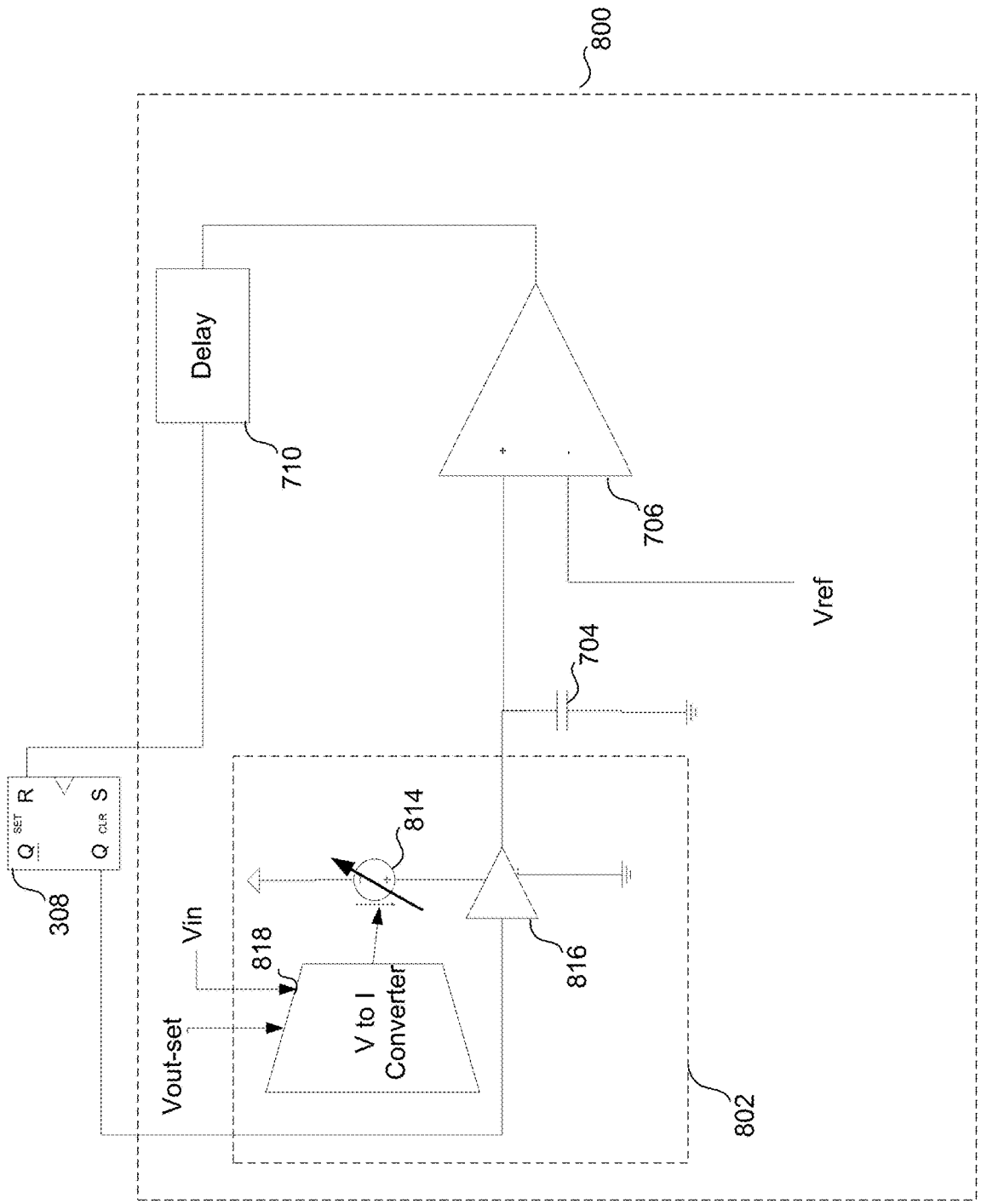
FIG. 8 illustrates a block diagram of a duty cycle limiter according to some embodiments.

FIG. 8 illustrates a block diagram of a duty cycle limiter 800 according to some embodiments. Duty cycle limiter 800 may be used for duty cycle limit generator 314. Duty cycle limiter 800 comprises a buffer 802, a capacitor 704, a comparator 706, and a delay circuit 710. Buffer 802 comprises a variable current source 814 and a buffer 816 coupled in series between a supply voltage and ground. Buffer 802 also comprises a voltage to current converter 818 to change the current provided by variable current source 814 in response to an output voltage setting Vout-set, which is derived from the output voltage Vout of boost converter 102. Voltage to current converter 818 generates a control signal to change the adaptive current provided by variable current source 814 in response to the control signal from RS flip-flop 308 that switches boost converter 102 and the output voltage setting Vout-set. Buffer 816 provides a voltage signal to capacitor 704 to charge capacitor 704 and to the non-inverting input of comparator 706 to trigger the comparator 706 in response to the control signal from RS flip-flop 308 that switches boost converter 102.

The charging of capacitor 704 functions as a timer. Capacitor 704 can be discharged for the next duty cycle by a discharge circuit (not shown). A fixed reference voltage Vref is provided to the inverting input of comparator 706. In duty cycle limiter 800, the reference voltage Vref applied to comparator 706 is fixed, and the current provided by buffer 802 is variable based on the input voltage Vin and the output voltage Vout. In contrast, in duty cycle limiter 800, the reference voltage Vref applied to comparator 706 is variable based on the input voltage Vin, and the current provided by buffer 702 is fixed. Comparator 706 provides a signal to delay circuit 710 to reset RS flip-flop 308 in response to the voltage across capacitor 704 exceeding the reference voltage Vref. As will be appreciated, buffer 802 and comparator 706 may be other types of circuits that provide a similar function. The maximum duty cycle (ClockMaxD) signal is adaptive and continuous to allow smoother control of the boost regulator 102.

Figure 9:
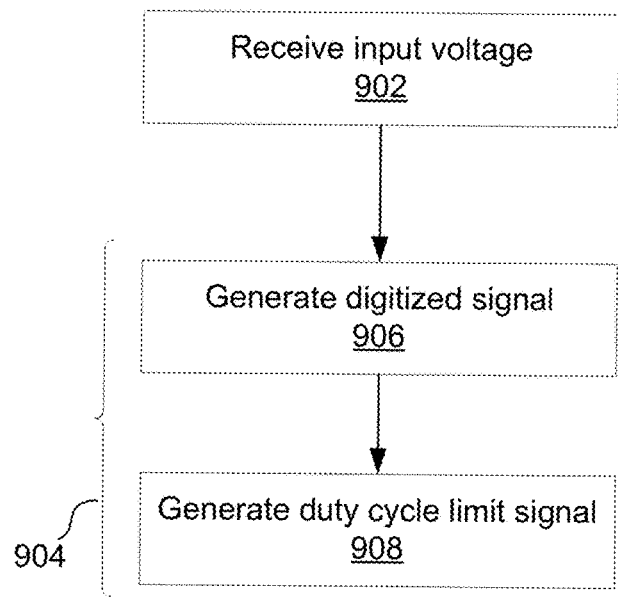
FIG. 9 is a simplified diagram illustrating a process flow for adjusting a duty cycle of a boost converter according to some embodiments.

FIG. 9 is a simplified diagram illustrating a process flow 900 for adjusting a duty cycle of boost converter 102 according to an embodiment.

At 902, an input voltage that is to be provided to boost converter 102 is received. At 904, a control signal is generated in response to the input voltage. The control signal is to be provide to boost converter 102 for adjusting the duty cycle of boost converter 102 to control the output voltage of booster converter 102.

Generating a control signal, at 904, may comprise, at 906, a digitized signal is generated in response to the input voltage of boost converter 102. At 908, a maximum duty cycle limit signal to limit the duty cycle of boost converter 102 is generated in response to the digitized signal.

Figure 10:
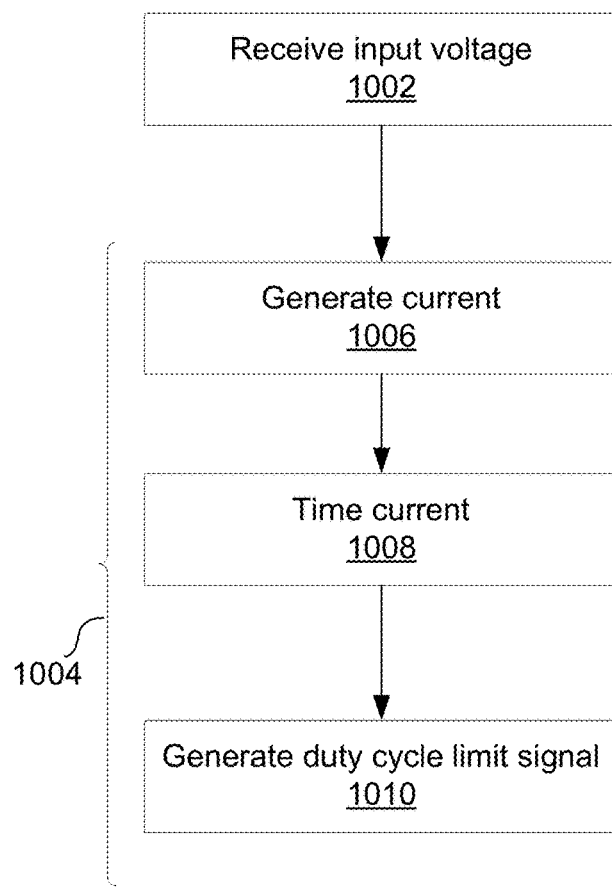
FIG. 10 is a simplified diagram illustrating a process flow for adjusting a duty cycle of a boost converter according to some other embodiments.

FIG. 10 is a simplified diagram illustrating a process flow 1000 for adjusting a duty cycle of boost converter 102 according to an embodiment.

At 1002, an input voltage that is to be provided to boost converter 102 is received. At 1004, a control signal is generated in response to the input voltage and the output voltage of boost converter 102. The control signal is to be provide to boost converter 102 for adjusting the duty cycle of boost converter 102 to control the output voltage of booster converter 102.

Generating a control signal, at 1004, may comprise, at 1006, a current is generated in response to the input voltage and the output voltage of the boost converter is generated. At 1008, the generated current is timed. At 1010, a maximum duty cycle limit signal is generated in response to the timed current.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A control circuit for adjusting a duty cycle of a boost converter comprising: an R-S flip flop with a set input coupled to receive a boost clock signal, a reset input coupled to receive a reset input signal, and an output to output the duty cycle to the boost converter; an OR gate coupled to provide the reset input signal to the reset input, the OR gate receiving a feedback loop input signal and a maximum duty cycle signal, the OR gate asserting the reset input signal when either the feedback loop input signal is asserted or the maximum duty cycle signal is asserted; and a maximum duty cycle limit generator configured to receive an input voltage provided to the boost converter and to generate, based on the input voltage, the maximum duty cycle signal to be provided to the R-S flip flop for adjusting the duty cycle of the boost converter in response to the input voltage and to adjust a gain of the boost converter to control an output voltage of the boost converter, wherein the maximum duty cycle signal limits the duty cycle of the boost converter, wherein the R-S flip flop is set by the boost clock signal input to the set input, the boost clock signal being derived based on a 50% duty cycle signal based on a system clock, and reset by either the feedback loop input signal or the maximum duty cycle signal, whichever is asserted first.

2. The control circuit of claim 1 wherein the maximum duty cycle limit generator comprises:
an analog-to-digital converter configured to generate a digitized signal in response to the input voltage of the boost converter; and
a duty cycle limit generator configured to generate the maximum duty cycle signal to limit the duty cycle of the boost converter in response to the digitized signal generated by the analog-to-digital converter.

3. The control circuit of claim 2 wherein the duty cycle limit generator comprises:
a current starved buffer configured to provide a current in response to a switching signal provided to control the boost converter;
a capacitor coupled between an output of the current starved buffer and a ground;
a reference voltage selection circuit configured to generate a reference voltage in response to the digitized signal; and
a comparator configured to generate the maximum duty cycle signal in response to a voltage across the capacitor and the reference voltage.

4. The control circuit of claim 2, wherein the duty cycle is initially set based on an output voltage of the boost converter, and wherein the duty cycle limit generator generates the maximum duty cycle signal that limits the duty cycle of the boost converter based on the input voltage of the boost converter.

5. The control circuit of claim 1 wherein the maximum duty cycle limit generator comprises:
a voltage-to-current converter to generate a current in response to the input voltage and an output voltage of the boost converter;
an analog timer to time the current; and
a duty cycle limit generator to generate a maximum duty cycle signal in response to the timed current.

6. The control circuit of claim 5 wherein the analog timer is a capacitor coupled to an output of the voltage-to-current generator to store the current.

7. The control circuit of claim 5 wherein the maximum duty cycle limit generator comprises:
a variable current source to generate a bias current in response to the current from the voltage-to-current converter;
a buffer to provide a buffer current in response to the bias current and a switching signal provided to control the boost converter;
a capacitor coupled between the output of the current starved buffer and ground; and
a comparator to generate a maximum duty cycle signal in response to a voltage across the capacitor and a reference voltage.

8. A method for adjusting a duty cycle of a boost converter, the method comprising: receiving an input voltage provided to the boost converter; generating, based on the input voltage, a maximum duty cycle signal; adjusting the duty cycle of the boost converter to be limited by the maximum duty cycle signal; and adjusting a gain of the boost converter based on the duty cycle adjustment to control the output voltage of the boost converter; asserting a signal to the boost converter with the duty cycle determined by the shorter of the adjusted duty cycle or the maximum duty cycle signal, wherein asserting the signal includes operating an R-S flip flop that is set by the boost clock signal, the boost clock signal being derived based on a 50% duty cycle signal based on a system clock, and is reset by either the adjusted duty cycle or the maximum duty cycle signal, whichever is asserted first.

9. The method of claim 8 wherein generating the maximum duty cycle signal comprises:
generating a digitized signal in response to the input voltage of the boost converter; and
generating the maximum duty cycle signal to limit the duty cycle of the boost converter in response to the digitized signal.

10. The method of claim 9 wherein generating the maximum duty cycle signal comprises:
generating a current in response to a switching signal provided to control the boost converter;
storing the current in a buffer;
generating a reference voltage in response to the digitized signal; and
comparing a voltage corresponding to the stored buffer current and the reference voltage to generate the maximum duty cycle signal.

11. The method of claim 8 wherein the duty cycle is initially set based on an output voltage of the boost converter, and wherein adjusting the duty cycle is in response to the input voltage and based on the maximum duty cycle signal.

12. The method of claim 8 wherein generating the control signal comprises:
generating a current in response to the input voltage and an output voltage of the boost converter;
timing the generated current; and
generating a maximum duty cycle signal in response to the timed current.

13. The method of claim 12 wherein timing the generated current comprising storing charge of the generated current.

14. The method of claim 12 wherein generating a maximum duty cycle signal comprises:

generating a bias current in response to the generated current;

generating a buffer current in response to the bias current and a switching signal provided to control the boost converter;

storing the buffer current; and comparing the stored buffer current and a reference voltage to generate a maximum duty cycle signal in response to a voltage indicative of the stored buffer current and a reference voltage.

15. A control circuit for adjusting a duty cycle of a boost converter comprising: means for receiving an input voltage provided to the boost converter; means for generating a maximum duty cycle signal to be provided to the boost converter for adjusting the duty cycle of the boost converter in response to the input voltage to adjust a gain of the boost converter to control the output voltage of the boost converter; means for providing an adjusted duty cycle based on an output voltage of the boost converter; and means for providing a signal to the boost converter where the duty cycle of the signal is the shorter of the adjusted duty cycle or the maximum duty cycle signal, wherein the maximum duty cycle signal limits the duty cycle of the boost converter, and wherein the means for providing a signal to the boost converter includes an R-S flip flop that is set by a boost clock signal input, the boost clock signal being derived based on a 50% duty cycle signal based on a system clock, and reset by either the adjusted duty cycle or the maximum duty cycle signal, whichever is asserted first.

16. The control circuit of claim 15 wherein the means for generating a maximum duty cycle signal comprises:

means for generating a digitized signal in response to the input voltage of the boost converter; and means for generating the maximum duty cycle signal to limit the duty cycle of the boost converter in response to the digitized signal.

17. The control circuit of claim 16 wherein the means for generating the maximum duty cycle signal comprises:

means for generating a current in response to a switching signal provided to control the boost converter;

means for storing the current in a buffer;

means for generating a reference voltage in response to the digitized signal; and means for comparing a voltage corresponding to the stored buffer current and the reference voltage to generate a maximum duty cycle signal.

18. The control circuit of claim 15 wherein the duty cycle is initially set based on an output voltage of the boost converter and the means for generating the maximum duty cycle signal further comprises means for adjusting the duty cycle of the boost converter in response to the input voltage of the boost converter and based on the maximum duty cycle signal.

19. The control circuit of claim 15 wherein the means for generating the control signal comprises:

means for generating a current in response to the input voltage and an output voltage of the boost converter;

means for timing the generated current; and means for generating a maximum duty cycle signal in response to the timed current.

20. The control circuit of claim 19 wherein the means for timing the generated current comprising means for storing charge of the generated current.

* * * * *